(12) United States Patent
Williams

(10) Patent No.: US 7,694,921 B1
(45) Date of Patent: Apr. 13, 2010

(54) AUTOMOTIVE DISMANTLER'S STANDS

(76) Inventor: Donald D. Williams, 263 Walnut Hill Rd., Orange, MA (US) 01364

( * ) Notice: Subject to any disclaimer, the term of this patent is extended or adjusted under 35 U.S.C. 154(b) by 0 days.

(21) Appl. No.: 12/157,463

(22) Filed: Jun. 11, 2008

Related U.S. Application Data

(60) Provisional application No. 60/934,141, filed on Jun. 11, 2007.

(51) Int. Cl.
*A45D 19/04* (2006.01)

(52) U.S. Cl. .................. 248/127; 248/161; 248/146; 248/354.3

(58) Field of Classification Search .............. 248/127, 248/146, 149, 440.1, 354.3, 354.2, 161; 137/234.6; 211/13.1
See application file for complete search history.

(56) References Cited

U.S. PATENT DOCUMENTS

| | | | |
|---|---|---|---|
| 4,596,371 A | | 6/1986 | Clark |
| 4,759,660 A | * | 7/1988 | Corbett .......................... 405/7 |
| 4,895,335 A | * | 1/1990 | Oliver ..................... 248/354.3 |
| 5,056,750 A | * | 10/1991 | Ellithorpe ................ 248/354.3 |
| 5,542,639 A | * | 8/1996 | Wixey et al. ................ 248/439 |
| 6,223,855 B1 | | 5/2001 | Lindner |

2004/0031645 A1    2/2004    Shepard

OTHER PUBLICATIONS

Advertisement showing automotive stand, Upfront magazine, Issue: Jan.-Apr. 2007, p. 46, published by The John Holmes Publishing Company, Whiting Iowa.
Advertisement, The Enviro-Rack stand, American Recycler, newspaper, Issue 3, Mar. 2007, Section A, p. 5, vol. 10, published by AR Publishing Co. Columbia Missouri.

* cited by examiner

*Primary Examiner*—Ramon O Ramirez
(74) *Attorney, Agent, or Firm*—Julia D. Hart

(57) ABSTRACT

Two- and four-columned stands for holding vehicles aloft during dismantling include A-frame style structures having no raised horizontal cross members. The stands have improved stability and safety for dismantlers and equipment operators in the work area and provide clear access to vehicle components. Preferred stands permit adjustment to the width of the stand at the top. Distance along the length of four-columned stands can be varied to accommodate vehicles of differing lengths, or height of the stand can be adjusted. Four-columned stands include a pair of two-columned stands, each of which is wider at its ground-level base than at the top, and two horizontal ground-level links that connect the two-columned stands at their bases. Preferably a top platform of each two-columned stand includes two horizontal sliding T-beam assemblies that contact portions of a mounted vehicle and also permit width adjustment. T-beam assemblies are mounted on top of diagonal column assemblies and the two resulting structures are firmly attached to opposite ends of a horizontal ground-level base plate. A height adjustment assembly, having a vertical adjustment tube and vertical extendable column, may be incorporated into diagonal column assemblies.

23 Claims, 11 Drawing Sheets

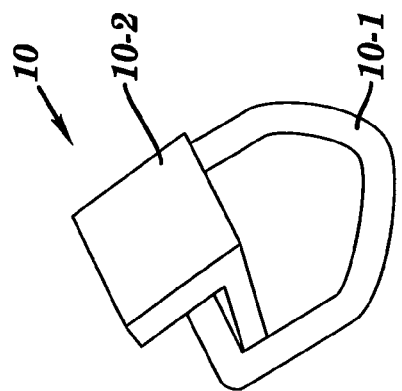
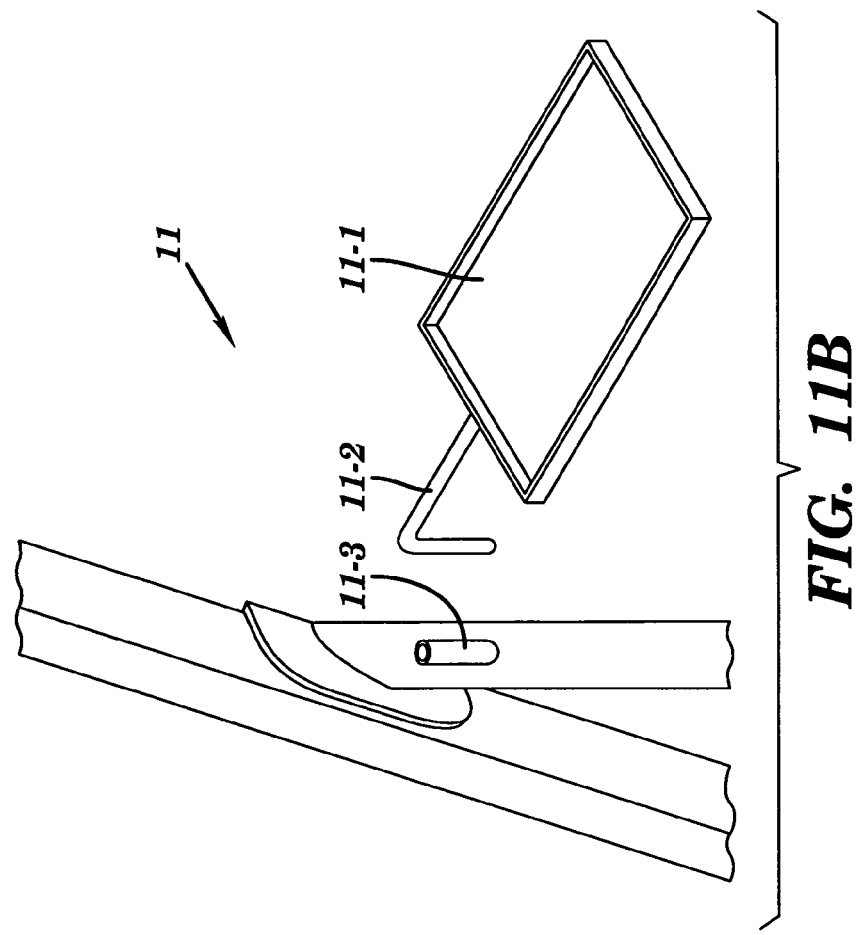
FIG. 11A
FIG. 11B

AUTOMOTIVE DISMANTLER'S STANDS

RELATED APPLICATIONS

This application claims priority under 35 U.S.C. Section 119(e) to U.S. Provisional Application No. 60,934,141 by Donald D. Williams, filed on Jun. 11, 2007 and entitled "Automotive Dismantler's Stands," the contents of which are incorporated by reference in their entirety.

BACKGROUND OF INVENTION

1. Technical Field

This invention relates to new A-frame style automotive dismantler's stands useful in salvage and recycling of vehicle parts. The stands of the invention are most useful with motor vehicles such as automobiles, vans, private or commercial pick-up trucks and tractor trailer trucks. As used herein, the term "motor vehicle" can mean a complete vehicle or a portion of the vehicle, such as a portion remaining after (1) an accident where components have been mangled or lost or (2) prior removal of some parts. The A-frame style stands of the invention are stable and provide improved, clear access to components under and around a vehicle mounted thereon. Preferably, the A-frame style stands are adjustable in width, length or height to facilitate removal of parts from virtually any vehicle, regardless of size or condition.

2. Brief Description of Background Art

Hundreds of thousands of motor vehicles, ranging from subcompacts to tractor trailer trucks, are discarded annually in the United States alone. Often these discarded vehicles are sent to scrap or junk yards where they are dismantled for recycling and salvage of useable parts that can be sold or auctioned in the used auto parts market. Vehicles sent to such yards may be dismantled to obtain all recyclable components at one time or kept in the yard for removal of parts over time, for example when specific components are sought by a particular customer. Portions of the vehicle that remain after total dismantling are crushed or pressed and treated as scrap metal. Many vehicles that are brought to scrap yards have sustained major damage; for example they may be missing entire sections or are substantially distorted in shape.

Scrap yards move and dismantle salvage vehicles using heavy equipment, usually a front end loader or a forklift, which has long or short forks mounted in front. Loaders having long forks with a maximum width of about 48" load vehicles lengthwise and are used for a variety of functions around the yard. Loaders mounted with short forks, known as scrappers, load vehicles from the side and are often used in the dismantling process to raise at least a portion of a vehicle off the ground and place it on a stand. After the vehicle has been mounted, people who dismantle the vehicle, called automotive dismantlers, work under and around the stand to remove parts. In small to medium-sized scrap yards, stands are made by local welders or builders, often based upon the design of a stand seen in another yard.

Typical stands have a square or rectangular box-type structure, of equal width at the top and the bottom, are built to one size and nonadjustable. This combination results in a stand that is unstable and prone to tipping, creating serious work hazards for automotive dismantlers and equipment operators in the vicinity. Potential for accidents is exacerbated when yards use these stands to mount and dismantle vehicles that are either too large or small for the stand or are distorted in such a way that they can not sit on the stand in a stable position. Even the process of removing parts can destabilize a vehicle.

The box-type structures of conventional stands include four vertical columns connected at right angles by horizontal cross members located significantly above ground level. The cross members create obstructions in the dismantling area and limit the dismantler's access to certain vehicle parts. This often requires that the vehicle be removed and repositioned on the stand several times for complete removal of parts, decreasing efficiency of the operation, increasing costs and increasing the potential for accidents.

The orientation of the vertical columns and presence of raised horizontal cross members of conventional stands can interfere with the loading and off-loading of vehicles by forklift operators. For example, loaders mounted with long forks often are not useable in the dismantling process because of the horizontal encumbrances. This means that the typical yard, which will usually have one front end loader and two different fork assemblies often has to remove a long fork assembly from the loader and replace it with a short fork assembly.

Other stands and assemblies for dismantling motor vehicles, in particular for draining fluids, are known in the art. One such stand, named "The Enviro-Rack" is a high capacity auto fluid removal and dismantling station sold by IronAx. United States Patent Publication 20040031645 to Sheppard et. al. discloses a vehicle articulation apparatus capable of elevating a vehicle for access by personnel and can be pivoted for more complete drainage of fluids before dismantling. U.S. Pat. No. 6,223,855 B1 to Lindner discloses a suspended disassembly line for automobile dismantling that uses a plurality of electrically operated lifts to stabilize and suspend the automobile. Such devices and assemblies are much more complex than conventional stands and too expensive for many salvage businesses, which continue to operate at the junk yard level. Moreover, these devices can actually limit access to parts of the vehicle, which is not preferred for most dismantling.

Accordingly, there is a need for improved dismantler's stands including improved stability and substantially obstruction-free work space for dismantlers and forklift operators. Simpler stands that are adjustable in length, width or height, preferably in two or all three dimensions, to accommodate vehicles of varying size or condition, are also needed.

BRIEF SUMMARY OF THE INVENTION

These concerns are met by the present invention, which provides unique A-frame style automotive dismantler's stands. As used herein, the phrase "A-frame style stand" means an apparatus that is wider and covers more area at the bottom of the apparatus which, in use, is intended to rest on the ground, than at the top of the apparatus, where at least a portion of a vehicle will be mounted.

A-frame style stands of the invention include stands that have two free-standing diagonal column assemblies, and stands that have four, free-standing, diagonal column assemblies, which assemblies support vertical load to be applied by a vehicle when mounted thereon. "Free-standing" means that the diagonal column assemblies are constructed without horizontal support above ground level. Diagonal column assemblies each include (1) a main diagonal column that is angled upwardly and inwardly toward the center of the stand and (2) a vertical load support firmly affixed thereto to help support vertical load imparted by a vehicle mounted on the stand. The main diagonal columns are a significant feature of the invention, as they not only function to support a significant portion of load placed upon the stand incorporating the diagonal column assemblies but they help create the A-frame structure, which significantly enhances the stability of the stands.

A-frame style stands having two diagonal column assemblies also include a horizontal, ground-level base that extends perpendicularly to the length of a vehicle or portion to be mounted on the stand and further include a top platform, at least portions of which, when the stand is in use, contact components under or around the vehicle. The two diagonal column assemblies are firmly attached to opposite ends of the horizontal ground-level base. The top platform is secured to the highest component of the diagonal column support assemblies, which can be a diagonal column or a vertical load support, such that the top platform is held horizontally and in parallel relation to the length of the horizontal base.

The top platform may be a single unit, such as a length of structural I beam steel. In this embodiment, the width of the platform is not adjustable and is defined by the length of the single unit. Preferably the top platform is made of more than one element where the elements are secured in adjustable relation, to permit variation in of the width of the stand at the top of diagonal column assemblies. By way of illustration, such a stand according to the invention includes two independent horizontal T-beams capable of sliding movement toward one another such that, even when the T-beams are in their closest position to one another, they do not touch.

Preferably these two-columned stands are used as front and back ends of an A-frame style four-columned stand, in which they define the width of the four-columned stand. The pair of two-columned stands are connected using two horizontal ground level links; a first link connects the left end of the front stand two-columned stand to a left end of the back two-columned stand and the second link connects the right end of the front two columned stand to the right end of the back stand two-columned stand. The two horizontal ground-level links extend in parallel to each other and to the length of a vehicle, or portion thereof, when a vehicle mounted on the four-columned stand. The ground level links connect the front and back two-columned stand ends of the four-columned stand via attachments to the horizontal ground-level bases. Thus, in accordance with a preferred embodiment of the invention, all horizontal cross members that connect four sides of the four-columned stand are located at ground level. Preferably the front and back two-columned stands are connected by the horizontal ground-level links in adjustable relation, so that the distance between the front and back of the four-columned stand can be varied to accommodate vehicles of differing length.

In one exemplified embodiment, where the top platform of an A-frame style four-columned stand is adjustable in width, the space defined by the four horizontal sliding T-beams when they are fully extended toward the outside of the stand is about 50 to 51 inches and can thus accommodate vehicle loading from the front or back of the stand using a long fork having a maximum width of about 48". When fully retracted inwardly, the space defined by the beams still permits open access to most components under and around the vehicle. It will be appreciated however, that salvage operations involved in dismantling particularly wide vehicles, for example modified vehicles such as limosines or armored vehicles, may require more space between the horizontal sliding T-beams when they are fully extended toward the outside of the stand. In such cases, forks wider than 48" can be used.

Height adjustment may be achieved by adding height directly to the top of the platform, for example by adding height to the vehicle-contacting surface of a horizontal T-beam, or by incorporating a height adjustment assembly into the diagonal column assembly.

One such height adjustment assembly includes (1) a vertical extendable column that defines a plurality of holes, spaced vertically and extending completely through opposing wide surfaces of the column, (2) a vertical adjustment tube that defines a hole that extends completely through opposing wide surfaces of the tube and (3) an adjustment pin, which can be inserted horizontally through the holes of each. The vertical extendable column is mounted within the vertical adjustment tube in a manner that permits the holes defined in the respective height assembly components to be aligned in horizontal relationship. The vertical adjustment tube is firmly attached to an upper end of the main diagonal column, the main diagonal column is angled on both ends so that the vertical adjustment tube is supported vertically and in perpendicular relation to the length of the horizontal base to permit the column to be raised and lowered within tube.

The top of a vertical support leg, when mounted to the bottom of the vertical adjustment tube, serves as a guide for the vertical extendable column when it is being lowered to the ground. In this aspect of the invention, the height adjustment assembly and vertical support leg constitute the vertical load support. The heights of each of four columns on a four columned stand can be adjusted to the same position, thereby forming a stand having a uniform height at the top. Heights of the adjustable columns may also be set independently in any combination, to accommodate almost any shape of a vehicle to be mounted thereon. When the vertical extendable column is in its lowest position, the bottom of it contacts a horizontal ground-level base.

Preferably, the A-frame style stands are adjustable in at least two dimensions, most preferably in all three—length, width and height—to provide the automotive dismantler with maximum flexibility in terms of the types of vehicles that can be disassembled thereon and minimizing potential for work-related hazards or injuries due to instability and other factors. The A-frame style stands may be prefabricated or customized to meet the requirements of individual salvage yards.

In a preferred aspect, the invention provides an A-frame style stand having a top platform that is adjustable in width. This stand comprises:

a pair of horizontal sliding T-beams;
a pair of T-beam retainer assemblies, each of which includes;
  a plate, on which a portion of the T-beam rests and slides;
  a T-beam retainer, contoured to hold a portion of the T-beam and a plate therein;
  each T-beam of the pair is mounted in a T-beam retainer, a portion of the bottom of the T-beam is in contact with an upper surface of the plate; and
  the T-beam retainer is firmly attached to the plate; and
a pair of diagonal column assemblies, each including
a main diagonal column having fixed length,
  the main diagonal column is angled on both ends, wherein the angles provide a stand that is narrower at the top than at the base when the main diagonal column is mounted on the stand and, the top of the main diagonal column is firmly attached to a bottom of the T-beam retainer and holds the T-beam retainer horizontally and parallel to the ground so that the T-beam can slide on the plate within the T-beam retainer, inward toward the center of the top of the stand and outward toward the outside of the stand,
a vertical support leg firmly attached to an inner surface of the main diagonal column, at a position that is about two thirds of the way up the total height of the main diagonal column, and
a base plate that extends horizontally at ground level,
  the base plate securely holds the main diagonal column assemblies in position so that the bottom of one main diagonal column is firmly attached to the left end of the base plate and the bottom of the other main diagonal column is firmly attached to the right end of the base plate, each diagonal column having the same length as the other, and the bottom of one vertical support leg is firmly attached to the left end of the base plate and the bottom of the other vertical support leg is firmly attached to the right end of the base plate, and the points of attachment for the vertical support legs to the base plate ends are located closer to the center of the of the base plate than the points of attachment for the main diagonal columns.

In one embodiment of an A-frame style stand having a top platform that is adjustable in width, as described in the preceding paragraphs commencing at text line 7 of page 7, the length of the main diagonal column ranges from about 66 to about 72 inches; the length of the base plate ranges from about 96 to about 126 inches and the inside width on the stand between the main diagonal columns ranges from about 50 to about 51 inches.

In another embodiment, a-frame style stands of the invention further include (1) at least one female base link defining a channel extending the length thereof, the female base link is firmly attached to one of the two ends of the base plate and runs parallel with the length of the vehicle when mounted on the stand and the female base link is attached at a position located toward the outside of the end of the base plate relative to the point of attachment of the vertical load support to the same base plate end and (2) at least one link having a structure that is capable of being received lengthwise within the channel of the female base link to form a connection, the link is positioned horizontally at ground level, extends lengthwise at a 90 degree angle to the length of the base plate and is connected to the base plate by extending into through the female link.

In a preferred embodiment, the A-frame style stand comprises a pair of two-columned stands, each having a structure according to the description in the preceding paragraphs, each two-columned stand of the pair is located in parallel relation to the other and one two-columned stand forms a front and the other two-columned stand forms a back of the four-columned stand and defines the width of the four-columned stand and further includes (1) four female base links, each one of which: defines a channel extending the length thereof; is firmly attached to a different one of the four base plate ends and extends parallel with the length of the vehicle when mounted on the stand; and is firmly attached at a position located toward the outside end of the base plate relative to the point of attachment of the vertical load support located on the same base plate end and (2) two horizontal ground level links located in parallel to one another that join the stand ends lengthwise, one of the links connects the two left stand base plate ends by their two respective female base links and the second link connects the two right stand base plate ends by their two respective female base links, wherein the connections formed at the front end of the stand, the connections formed at the back end of the stand or connections formed at both ends are adjustable so that the distance between the front and back ends of the stand can be varied to accommodate vehicles of differing length.

In yet another embodiment the invention provides a combination of components for assembling a stand comprising at least one two-columned stand according to the teachings herein and at least one link. Most preferably the combination includes a pair of two-columned stands and two horizontal ground-level links for connecting the pair of stands to form a single unit.

In yet another preferred aspect, the A-frame style stands of the invention incorporate a height adjustment assembly. The stand comprises:

a pair of T-beams, a pair of horizontal sliding T-beam retainer assemblies, each of which includes,
   a plate on which a portion of the T-beam rests and slides
   a T-beam retainer contoured to hold a portion of the T-beam and a plate therein;
   each T-beam of the pair is mounted in a T-beam retainer, a portion of the bottom of the beam is in contact with an upper surface of the plate; and the T-beam retainer is firmly attached to the plate; and a pair of diagonal column assemblies, each including:
   a main diagonal column having fixed length, the main diagonal column is angled on both ends; and
   a vertical load support, including:
      a vertical support leg having an upper edge that defines a shape:
      a vertical extendable column that includes a plurality of holes spaced vertically, the holes are made in one wide surface of the extendable column and extend through the opposing wide surface;
      a vertical adjustment tube that defines a hole made on a wide tube surface, the hole extends through the opposing surface; and
      an adjustment pin that can be inserted horizontally into the holes in the vertical extendable column and in the vertical extendable tube and fix the height of the extendable column within the adjustment tube; wherein,
      the vertical extendable column is mounted within the vertical adjustment tube so that the holes in the vertical adjustment tube and the holes on the vertical extendable column can be aligned in horizontal relationship;
      an outer vertical surface of the vertical adjustment tube, which is at a 90 degree angle to the surface defining the hole, is firmly attached to the top of the diagonal column, on the larger of two angles cut into the main diagonal columns, the angles are calculated to support the vertical adjustment tube vertically and in perpendicular relation to the ground to permit the column to be raised and lowered within tube and maintain an A-frame structure to the stand;
      a lower horizontal end of the surface of the vertical extendable column that is attached to the main diagonal column has a shape complementary to the shape defined by the vertical support leg and is firmly attached thereto;
   the top of the vertical adjustment column is firmly attached to a bottom of the T-beam retainer and holds the T-beam retainer horizontally and parallel to the ground so that the T-beam can slide horizontally on the plate within the T-beam retainer, inward toward the center of the top of the stand and outward toward the outside of the stand, and
   a base plate that extends horizontally at ground level, and the base plate securely holds the main diagonal column assemblies in position; the bottom of one main diagonal column is firmly attached to the left end of the base plate and the bottom of the other main diagonal column is firmly attached to the right end of the base plate, each diagonal column having the same length as the other and the bottom of the left vertical support leg, which serves as a guide for the vertical extendable column when it is being lowered to the ground, is firmly attached to the left end of the base plate and the bottom of the other vertical support leg firmly attached to the right end of the base plate, wherein the points of attachment for the vertical support legs to the ends of the base plate are located closer to the center to the of the base plate than the points of attachment for the main diagonal columns to the ends of the base plate.

In an embodiment of an A-frame style stand incorporating a height adjustment assembly as described in the preceding paragraphs, beginning on page 10 at text line 8, the length of the main diagonal column ranges from about 34 to about 48 inches and the length of the base plate ranges from 96 to about 126 inches.

In yet another embodiment, A-frame style stands that are height adjustable further include, (1) at least one female base link defining a channel extending the length thereof, the female base link is firmly attached to one of the two ends of the base plate and runs parallel with the length of a vehicle when mounted on the stand and the female base link is attached at a position located toward the outside of the end of the base plate relative to the point of attachment of the vertical load support to the same base plate end and (2) at least one link having a structure that is capable of being received lengthwise within the channel of the female base link to form a connection, the link is positioned horizontally at ground level, extends lengthwise at a 90 degree angle to the length of the base plate and is connected to the base plate by extending into the female link.

In yet another preferred embodiment, a four-columned A-frame style stand that is height adjustable includes a pair of two-columned stands as described in the preceding paragraphs in which the two, two-columned stands are located in parallel relation to one another, with one of the two-columned stands forming a front and the other two-columned stand forming a back of the four-columned stand, and further includes (1) four female base links, each one of which: defines a channel extending the length thereto, is firmly attached to a different one of the four base plate ends and extends parallel with the length of the vehicle when mounted on the stand, and is firmly attached at a position located toward the outside end of the base plate relative to the point of attachment of the vertical load support located on the same base plate end and;

(2) two horizontal ground level links located in parallel to one another that join the two-columned stand ends lengthwise, one of the links connects the two left stand base plate ends by their two respective female base links and the second link connects the two right stand base plate ends by their two respective female base links, wherein the connections thus formed are adjustable and the distance between the front and back ends of the stand can be varied to accommodate vehicles of differing length.

Also included are combinations of components for assembling A-frame-style stands of the invention that are adjustable in height.

Methods for assembling two and four-columned stands of the invention and methods of using the stands in dismantling of vehicles are also included.

BRIEF DESCRIPTION OF THE DRAWING

FIG. 6 also shows the end of a link connected at the base plate end.

FIG. 11, including FIGS. 11A and 11B, is a partially exploded view illustrating optional components that can be added to the diagonal column or vertical load support of a two-columned or four-columned stand of the invention. FIG. 11A shows a D-ring and D-ring retainer. FIG. 11B shows an automotive dismantler's tool tray assemblage.

DETAILED DESCRIPTION OF THE INVENTION

Motor vehicles on the road today range from subcompacts to tractor trailer trucks. The average vehicle weighs about 3500 lbs, while large SUVs and some passenger pick up trucks weigh up to 10,000 pounds or 5 tons. Other passenger pick up trucks and commercial trucks weigh significantly more, up to about 20,000 pounds or 10 tons. Two-columned and four-columned stands of the invention can be made to safely accommodate limited ranges within this vast range or support just about anything from subcompacts to large commercial vehicles and construction equipment depending on the material, gauge and dimensions of the material used.

For example, when a diagonal column assembly of the invention is made of structural steel tubing, which is preferred, the dimensions and gauge (wall thickness) of the tubing will influence the load-bearing capacity of the stand. The same applies to other materials that might be used, such as aluminum or composites Light to medium duty salvage operations, e.g. up to about 1 ton, will require structural tubing of lesser gage than heavy duty applications in which large heavy commercial vehicles will be dismantled. Dimensions of other components may vary as well. This section describes the construction and use of several stands according to the invention and illustrates how individual elements or assemblies of the invention can be used to make and use a variety of automotive dismantler's stands to accommodate various needs of a salvage yard. All materials used in the invention are readily available.

A-Frame Style Stands Adjustable in Length, Width or Height

Figure 1:
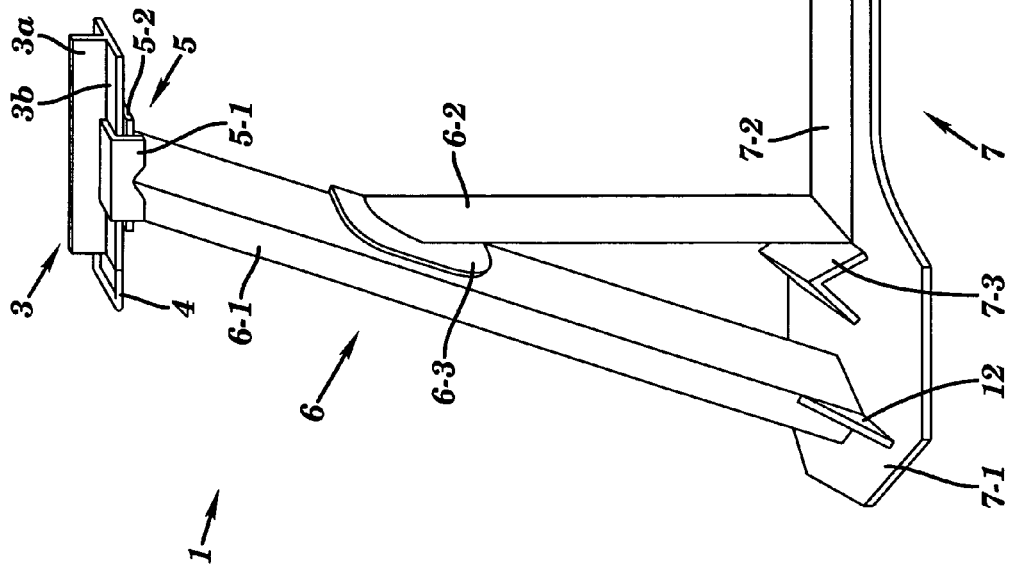
FIG. 1 is a schematic view of a two-columned stand of the invention, including a T-beam assembly that permits the width of a top platform to be adjusted.

FIG. 1 shows a preferred embodiment of a two-columned A-frame style stand (1), which can be connected, either adjustably or in a fixed relation, to a second two-columned stand of the invention to form a complete four-columned A-frame style automobile dismantler's stand for removing parts from a vehicle weighing up to about 20,000 to 30,000 pounds. Preferably the stand is to be used with motor vehicles weighing up to 20,000 pounds. The height of this stand is 71" and readily accommodates persons who are 5'9" tall and shorter working on vehicles mounted thereon. The length of main diagonal columns (6-1) is 68 inches, the length of vertical support legs (6-2) is 44.25 inches and the length of base plate (7-1) that forms the width of the stand is 96 inches. The two-columned stand may be used alone in automobile dismantling, provided that it is appropriately stabilized horizontally, preferably using two ground-level horizontal links, hereinafter "links" (8) according to the teachings of the invention. Preferably, the two-columned stand is used as a stand end to be connected to a second stand having essentially the same structure to form a four-columned stand.

Preferred materials and dimensions for other elements hereinafter described are listed in Table 1 attached as an integral part of this description. Also listed in Table 1 are dimension modifications that may be used by persons skilled in the art to form A-frame style stands according to the invention.

Figure 5:
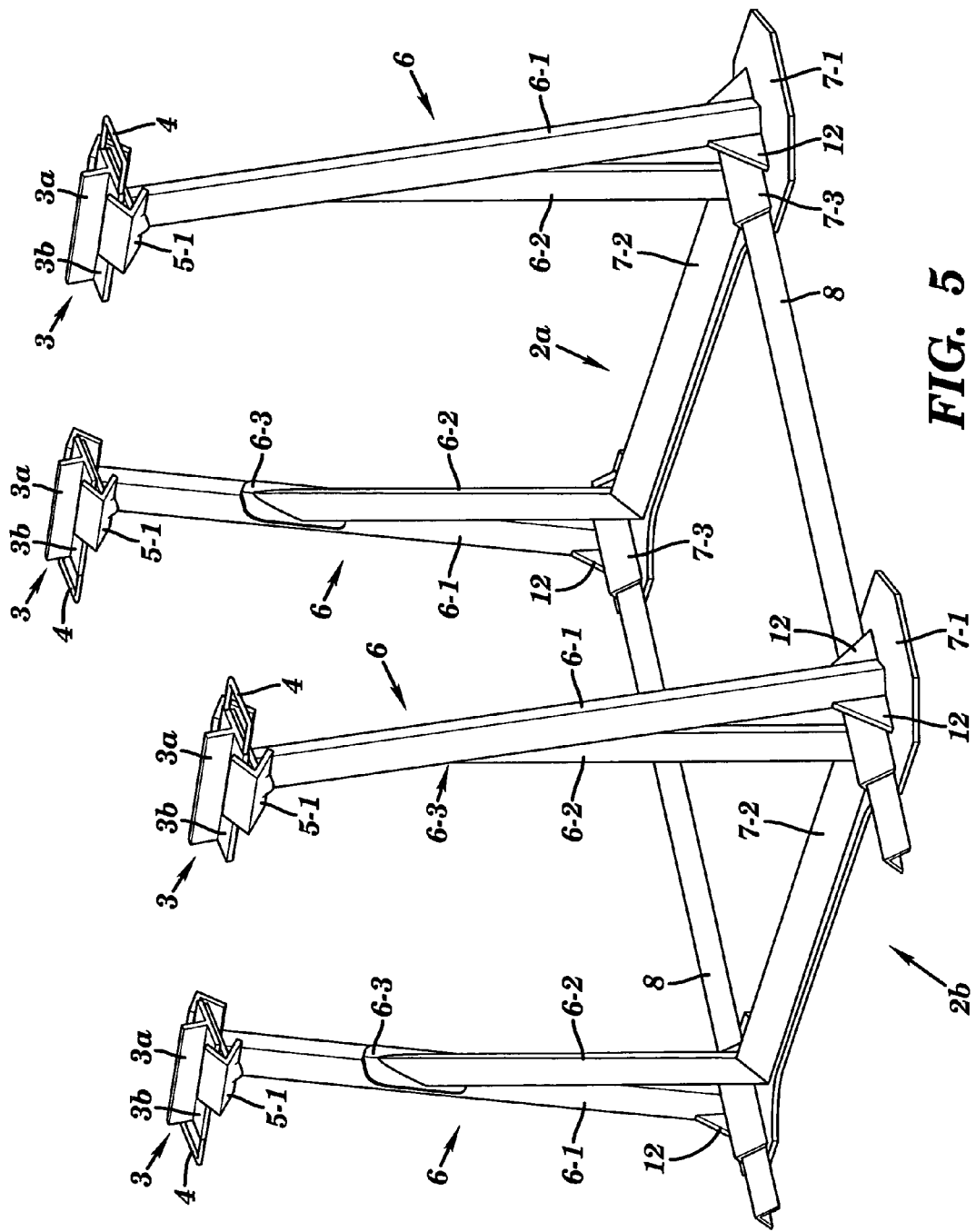
FIG. 5 is a perspective view of a four-columned A-frame type stand of the invention, constructed from a pair of two-columned stands according to FIG. 1, connected by two links.

A four-columned stand (2) connected by a pair of two-columned stands, each having the components illustrated in FIG. 1, is depicted in FIG. 5 and is adjustable to accommodate vehicles ranging in width from about 5 feet to about 7.5 feet. The stand holds vehicles varying in length from about 12 to about 20 feet and up to about 20,000 to 30,000 pounds in weight Horizontal Sliding T-Beams and T-Beam Retainer Assembly Horizontal Sliding T-Beams As shown in FIG. 1, the base of the two-columned stand (1) is wider and covers more area at its bottom than at the top. Two horizontal sliding T-beams (3) inserted into two T-beam assemblies (5) form a top platform of the stand that comes in contact with a vehicle to be mounted thereon. Horizontal sliding T-beam (3) (hereinafter "T-beam") has a vertical web (3a) integrated into a horizontal flange (3b). See FIG. 2 for an enlarged view. Preferably the T-beam is formed by cutting a structural I-beam in half lengthwise at the web, for example by torch cutting, although other similarly shaped structures alternatively can be used.

T-beams (3) are "independent," meaning that, even when fully retracted inwardly toward the center of base plate (7-1) that forms the bottom of the stand, ends of T-beams (3) never come in contact with one another and always leave a space between them. The T-beam's "upside down "T" design offers a number of advantages to dismantlers and heavy equipment operators.

Thickness of the Ridge at Top of Web (3a)

When the stand is in use, the ridge at the top of web (3a) of the T-beam (3) is the only portion of the stand to come in contact with under parts of the vehicle. A preferred dimension for the thickness of the ridge of web (3a) is 0.250 inches, although other web thicknesses can also be used. The length of each sliding T-beam (3) is preferably 15 inches and can range from about 14 to 21 inches. See Table 1.

Figure 8:
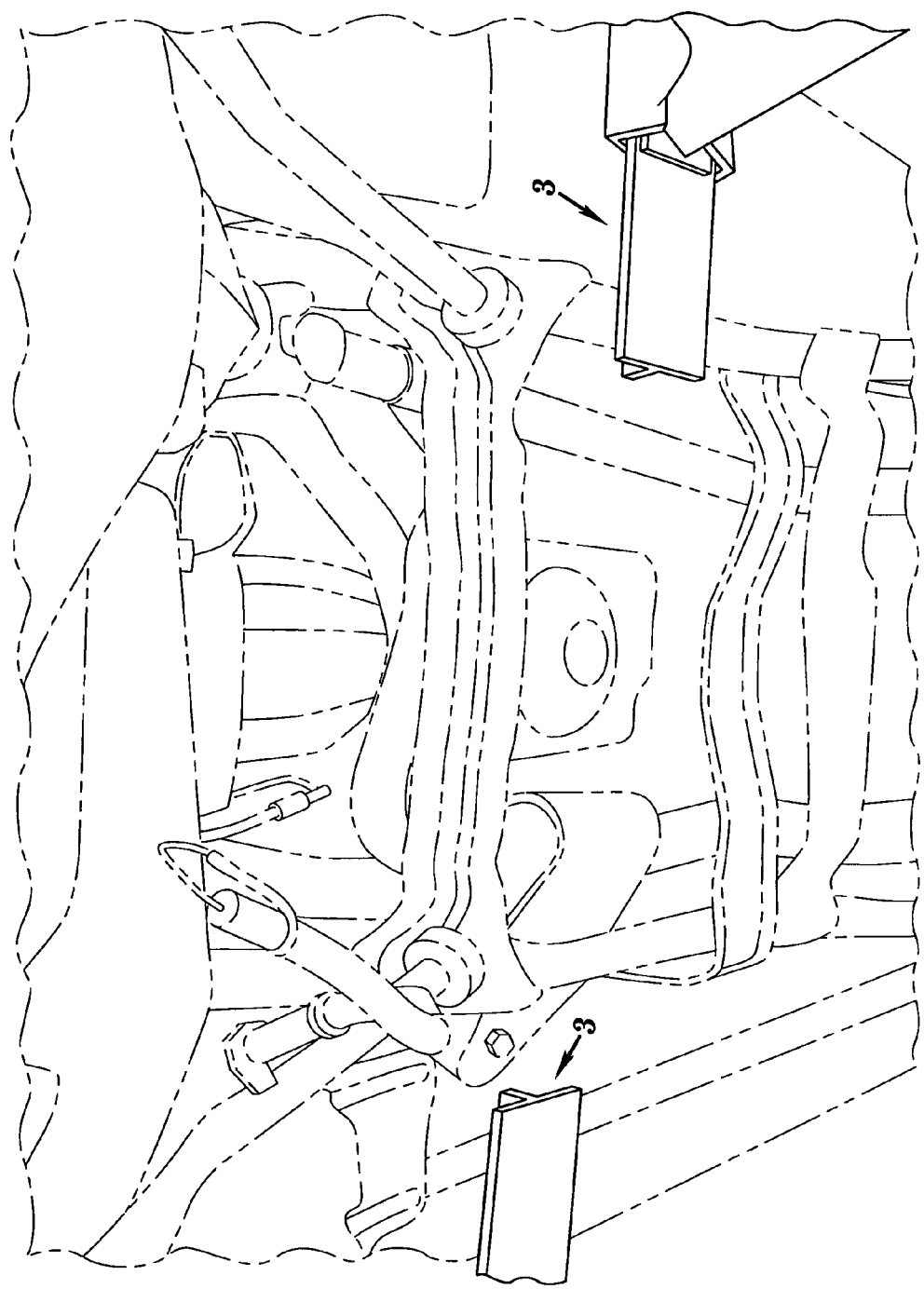
FIG. 8 is a partial bottom view of the vehicle mounted as in FIG. 7, showing the underside of a salvage vehicle in contact with a pair of T-beams (3).

Having this limited amount of contact between the stand and the vehicle provides clear open space for the dismantler and loader operator to take advantage of. The underside of a salvage vehicle in contact with a pair of T-beams according to FIGS. 1, 2 and 3, having a web thickness of 0.250 and length of 15 inches is shown is FIG. 8 and illustrates the open space available to an automotive dismantler to work while removing parts from under a vehicle.

Height of Web (3a)

The height of web (3a) can be from 2 to 6 inches, and preferably is 2.50 inches. The height provides enough distance between the bottom of the vehicle and the tops of the main diagonal columns (6-1) to permit the fork of the loader or forklift to be removed from under the vehicle when the stand has been loaded from its side position, with little interference from the main diagonal columns (6-1).

Strength and Durability

Although web (3a) may have a thickness of a little as ¼ inch, flange (3b) of T-beam (3) is 0.50 to 1.0 inch thick, preferably 0.50 inches thick and the T-beam ranges from 2-6 inches high, preferably 2.5 inches high. See Table 1. Using a structure having these dimensions results in a structure that is very strong and can withstand heavy use for many years.

Replacement and Change of Height

T-beams (3) easily can be removed from the T-beam retainer assembly (5) by either grasping their outside ends or using handles (4) located on the outer ends of T-beams (3) and sliding them out toward the perimeter of base plate (7-1) of the two-columned stand (1). Handles (4) are optional but do facilitate removal. Virtually any type of handle can be used. Handles (4) are firmly attached to ends of T-beams (3), as illustrated most clearly in FIG. 2, for example by welding. Handles (4) also form stops at the outer ends of T-beams (3) to prevent the T-beams from being pushed into the T-beam assembly (5) during retraction toward the center of the stand, especially when the T-beams are being fully retracted. Having handles (4) such as the ones shown in FIGS. 1 and 2 also helps prevent injury to hands and fingers of dismantlers operating the stand. Instead of or in addition to having handles as stops, other stop structures, such as tabs, can be welded to outer sides of T-beams (3) to prevent them from being pushed all the way through the T-beam assemblies (5).

T-beams (3) are removed, for example, when they are worn out or damaged and require replacing or when a T-beam having different dimensions is desired. For example, T-beams (3) having a height of 2.50 inches can be replaced with one having a height of 6 inches to change the overall height of the stand from 71 to 74.50 inches. Height increases alternatively can be achieved by adding material, preferably steel of suitable gauge, to the ridge of web (3a) to make it higher.

T-Beam Assembly (5)

Figure 2:
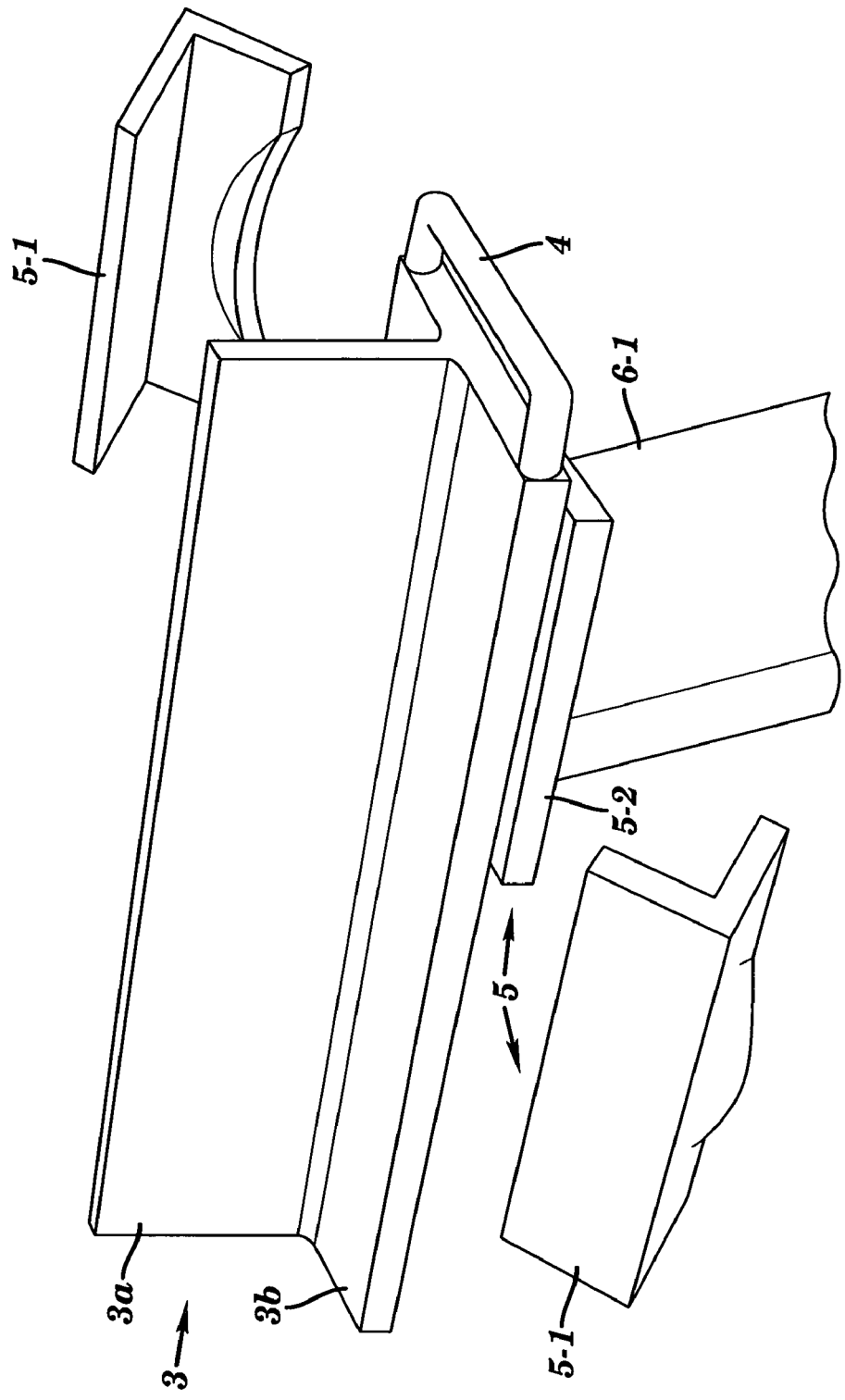
FIG. 2 is a detailed, partially exploded schematic view of a horizontal T-beam and T-beam assembly.
Figure 3:
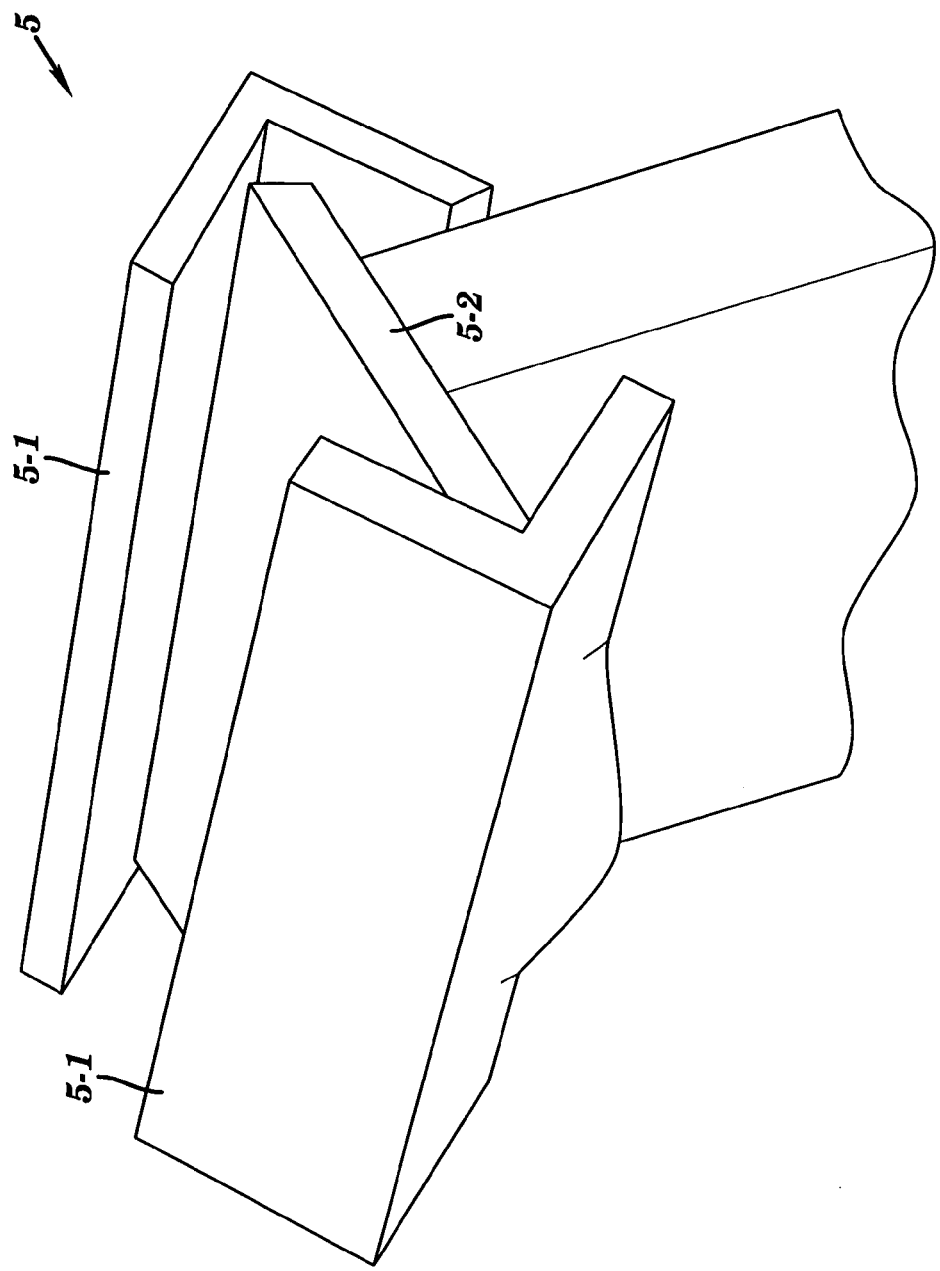
FIG. 3 is a detailed view of a T-beam assembly illustrating the structural relationship of a T-beam retainer, plate and main diagonal column to hold a T-beam capable of horizontal sliding movement therein.

Each T-beam assembly (5) includes a T-beam retainer (5-1) and flat plate (5-2), (hereinafter "plate"), having a smooth surface. Plate (5-2) is firmly attached to the top of main diagonal column (6-1) in a level position, paralleling the ground, and provides the surfaces on which bottom surfaces of the T-beam flange (3b) slides for inward and outward movement. T-beam retainers (5-1) are located in the same plane as plates (5-2), contoured to fit around the T-beam flanges (3*b*) and plate (5-2) and still permit unrestricted movement. Contouring may be achieved either by forming or notching. FIG. 1 shows a two-columned stand including a T-beam retainer (5-2) that has been contoured to main diagonal column (6-1) by notching, while FIGS. 2, 3 and 5 show T-beam retainer (5-1) that has been contoured by forming. These and other methods can be used to contour the T-beam retainers (5-1).

A preferred configuration for T-beam assemblies (5) is shown is greater detail in FIGS. 2 and 3. More specifically, plate (5-2), which is a 5.25×5.25 inch piece of 0.50 inch thick flat steel stock, is welded in place, mounted on main diagonal column (6-1) with the flat surface in a level position. Plate (5-2) is mounted on main diagonal column (6-1) on ⅛ of a turn, as shown most clearly in FIG. 2. T-beam retainer (5-1) is positioned parallel to plate (5-2), formed to fit main diagonal column (6-1) and placed into position over plate (5-2) between T-beam (3) and the main diagonal column as shown See FIGS. 2 and 3. When T-beam retainer (5-1) is properly formed, and firmly attached to the top of main diagonal column (6-1) it allows the T-beam to extend and retract freely, without resistance.

When T-beams (3) are each fully retracted from within T-beam retainers (5-1) toward the center of two-columned stand (1), the distance between the inner ends of T-beams (3) is about 30 inches. This allows plenty of room for components to be removed from under the vehicle. When T-beams (3) are fully extended outwardly toward of opposing ends of the base plate (7-1) the distance between the inner ends of T-beams (3) is about 50 inches. This distance between the inside top portion of main diagonal columns (6-1) is also 50 inches. Having this amount of space available at the top of the two-columned stand permits the use of front end loaders or forklifts having long forks that load vehicles from the front or rear. More particularly, the 50 inch space between fully extended T-beams (3) and also between inside top portions of main diagonal columns (6-1) allows a loader operator to load a vehicle onto the four-columned stand from the front or back of the stand using equipment having forks up to 48 inches wide. If, for any reason the alignment of the vehicle on T-beams (3) or the distance between T-beams (3), needs to be adjusted, an adjustment can readily be made by lifting the vehicle with a front end loader or hydraulic jack about ½ inch above each T-beam (3) and moving T-beams (3) inwardly or outwardly, as desired.

Diagonal Column Assembly (6)

Main Diagonal Columns (6-1)

Referring again to FIG. 1, two main diagonal columns (6-1) angle inwardly and upwardly toward each other from the base plate (7-1). The A-frame style structure of the stand is provided by main diagonal columns (6-1), which preferably are made from structural steel tubing stock that is cut to a desired length and then cut, at an angle ranging from 78 to 86 degrees, on each end, preferably 79 degrees for this stand. Structural square steel tubing is the preferred material for making for main diagonal columns (6-1) however; other structural tubing can also be used, such as rectangular or round tubing or angle iron, or H-beam or I-beam structural steel.

Figure 6:
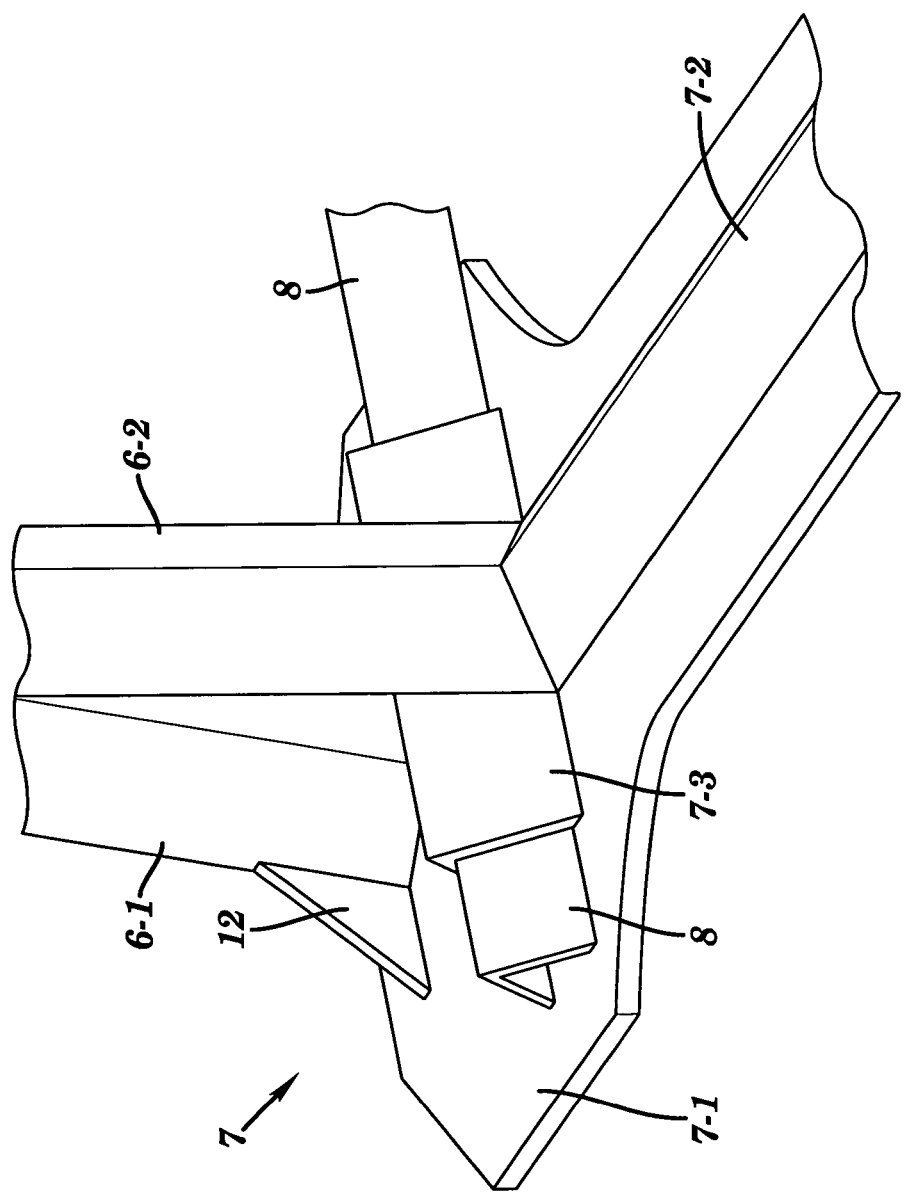
FIG. 6 is a detailed perspective view taken from inside of a base plate end including an assemblage of a diagonal column, vertical support leg, female base link and gusset, showing a preferred orientation of the structures relative to each other and to the end of the base plate on which the structures are mounted.

Main diagonal columns (6-1) each have the same length, are firmly attached, preferably by welding, so that the bottom of one main diagonal column (6-1) is firmly attached to the left end of base plate (7-1) and the bottom of the other main diagonal column (6-1) is firmly attached to right end of base plate (7-1). Gussets (12) are welded to the bottoms of main diagonal columns (6-1) at the ends of base plate (7-1) for added support, as shown in FIGS. 1 and 6.

The angles on main diagonal columns (6-1) give the stand stability when being loaded using heavy equipment and also when parts are being removed. They also provide more area for dismantlers operating under the stand. The use of square structural tubing to form the main diagonal columns (6-1) gives the stands of the invention another advantage in terms of deflection properties. More specifically, when structural square tubing is used to make main diagonal columns (6-1), the columns (6-1) are preferably placed on base plate (7-1) so that, when facing a stand from the front or back, the four corners on main diagonal column (6-1) appear to be facing north, south, east and west. When placed in this position, main diagonal columns (6-1) help deflect any force that might be applied to them by approaching or departing heavy equipment during the loading and off-loading processes, respectively, instead of taking the full force of energy that normally would be absorbed into main diagonal column (6-1) if the column was to be struck on its flat and wider surface. Use of structural round steel tubing will afford similar advantageous deflection properties. Structural square tubing that is not so oriented on base plate (7-1) and other structural shapes can be used, but they will not offer the same deflection advantages as in a preferred embodiment.

Vertical Support Legs (6-2)

Vertical load supports, referred to here as vertical support legs (6-2) are added to the stand for the purpose of adding extra support for main diagonal columns (6-1). Each vertical support leg has the same length as the other, is shorter than the length of main diagonal column (6-1), and extends from ground level to an inner surfaces that is about ⅔ of the length of main diagonal column (6-1). Preferably, vertical support legs (6-2) are positioned perpendicular to base plate (7-1). However, vertical load supports positioned on base plate (7-1) at an angle that does not materially interfere with dismantler's access under the stand, while not preferred, are also included.

The bottom of one vertical support leg (6-2) is firmly attached to left end of base plate (7-1) and the bottom of the other vertical support leg (6-2) is firmly attached to the right end of base plate (7-1), such that the points of attachment for vertical support legs (6-2) to the ends of base plate (7-1) are located closer to the center of the of base plate (7-1) than the points of attachment for main diagonal columns (6-1) to the base plate (7-1).

FIG. 1 shows how vertical support leg (6-2), made out of structural angle iron, is attached to a main diagonal column (6-1) of square structural tubing. This connection is made by welding and bears the brunt of the force of load applied to the top of main diagonal column (6-1).

Crack Resistant Plate (6-3)

In a preferred embodiment, a crack resistant plate (6-3) made from structural tubing or angle iron, is affixed, for example by welding/between the main diagonal column (6-1) and vertical support leg (6-2) to reinforce the strength of the structure at this connection.

Base Plate Assembly (7)

Figure 4:
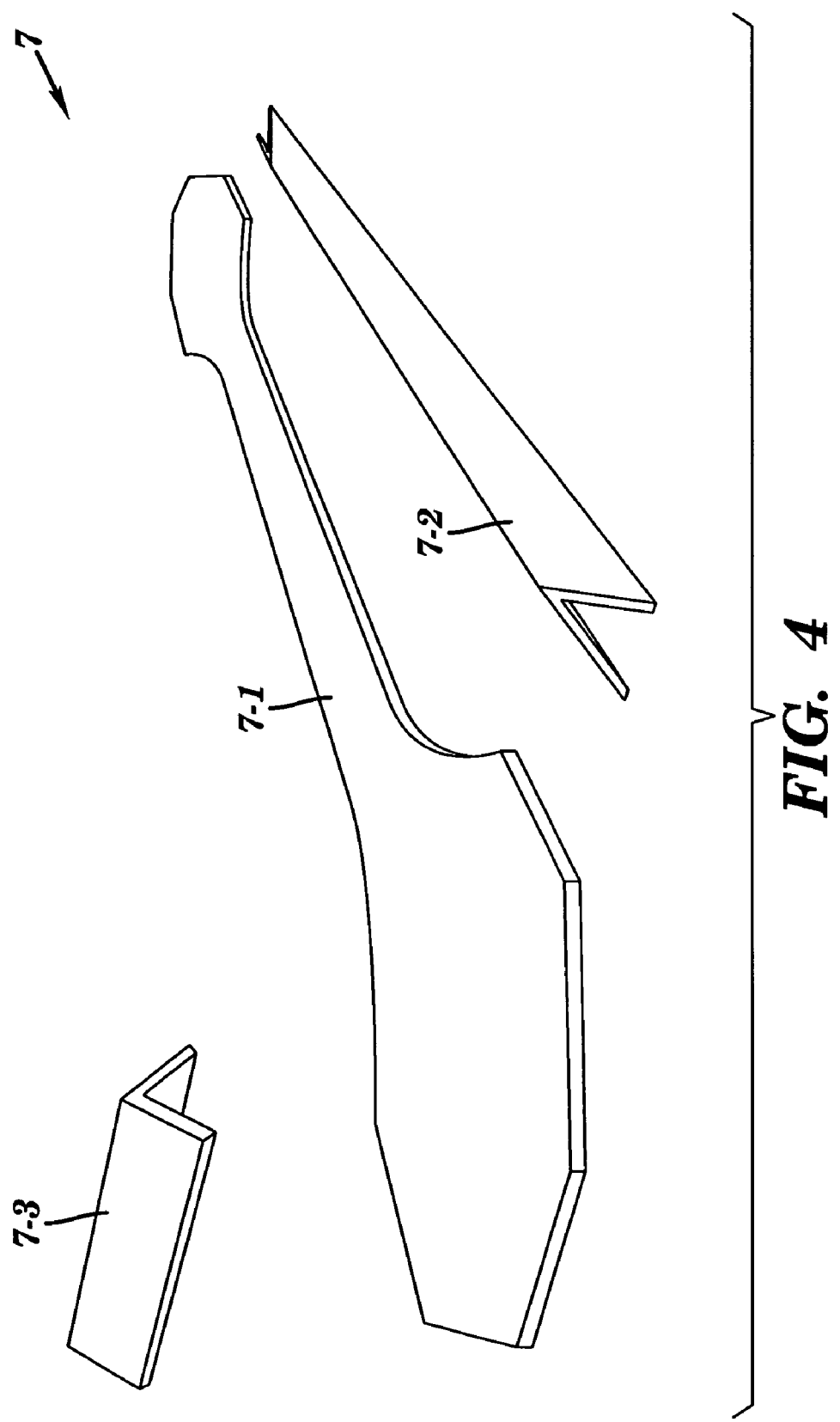
FIG. 4 is an exploded view of a base plate assembly according to FIG. 1.

Referring to FIGS. 1, 4, and 6, the bottom of the two-columned stand (1) of FIG. 1 is a base plate assembly (7) having base plate (7-1), reinforcing cross member (7-2) and two female receiving members, called female base links (7-3).

Base plate (7-1)

Base plates of the invention are extremely stable and help prevent the stand from tipping over, even if the stand is bumped by heavy equipment during the on or off loading process. Base plate (7-1) is cut from a flat steel plate having a thickness of 0.50 inches and a width of 30 inches and is 96 inches long. Possible modifications are listed in Table 1.

The length of base plate (7-1) is not limited to 96 inches. In accordance with the invention, base plate (7-1) is wider than the vehicle being placed on the stand. A base plate of 8 feet is appropriate for vehicles having a maximum width of 7.5 feet. Longer base plates are used for motor vehicles wider than about 7.5 feet.

In the Drawing, base plate (7-1) has two ends that are wider than the middle section, as most clearly shown in FIG. 4. While this shape is preferred, it is not required. The ends of base plate (7-1) must be of sufficient length and width to accommodate the dimensions of diagonal column assembly (6) and female base link (7-3) to be firmly attached thereto and this creates a minimum size for the ends. However, base plate (7-1) optionally may be made to have uniform width. This is not preferred, primarily for economic reasons, but is one alternative to the shape shown.

Reinforcing Cross Member (7-2)

As shown in FIGS. 1 and 4, the base plate assembly (7) may also include a reinforcing cross member (7-2) located between vertical support legs (6-2); the reinforcing cross member (7-2), adds strength to base plate (7-1). Preferably reinforcing cross member (7-2) is made of angle iron having a flange thickness of 0.375-0.75 inches. The flange of the angle iron is welded to base plate (7-1), where it is fastened low, close to the ground, and creates a 3 inch rise from base plate (7-1).

Female Base Links (7-3) and Links (8)

Female base links (7-3) are used to retain and regulate the distance between a pair of two-columned stands connected to form a single four-columned stand. Each female base link (7-3) is made of a length of angle iron having a wall thickness of 0.3125 and 4 inch flange width. The length of female base links (7-3) is one half the width of base plate (7-1). In the embodiment of the two-columned stand (1) being described, the length of female base links (7-3) is 15 inches. See also Table 1.

Preferably, female base link (7-3) is welded between main diagonal columns (6-1) and vertical support legs (6-2) at each end of base plate (7-1), as shown in FIGS. 1 and 6. Alternatively, female base links (7-3) may be positioned outside of main diagonal columns (6-1), toward the perimeter of the stand (1), in which case the length of base plate (7-1) may have to be increased.

Female base links (7-3) define a recess or channel, which is formed, for example, by the shape of the angle iron, for receiving horizontal, ground level links, called links (8).

To connect a pair of stands, one of which will form a back of a four-columned stand and the other will form a front of a four-columned stand, a pair of two-columned stands (1) are placed in parallel to each other and perpendicularly to two links (8) positioned horizontally, at ground level between opposing ends of each base plate (7-1). Links (8) form the sides of the four-columned stand and define its length, while two stands according to FIG. 1 form the width of the four-columned stand. A four-columned stand according to the invention is shown is FIG. 5, in which two-columned stand (2a) is the front of stand (2) and two-columned stand (2b) is the back of stand (2). Each end of a link (8), which is increment smaller than for female receiving link (7-3), is fitted into female base link (7-3), as shown in FIG. 6 and forms a stable connection. A threaded locking bolt or similar locking mechanism may be used to tighten the connection between female base links (7-3) and links (8), but this is not necessary to obtain a secure connection.

Figure 7:
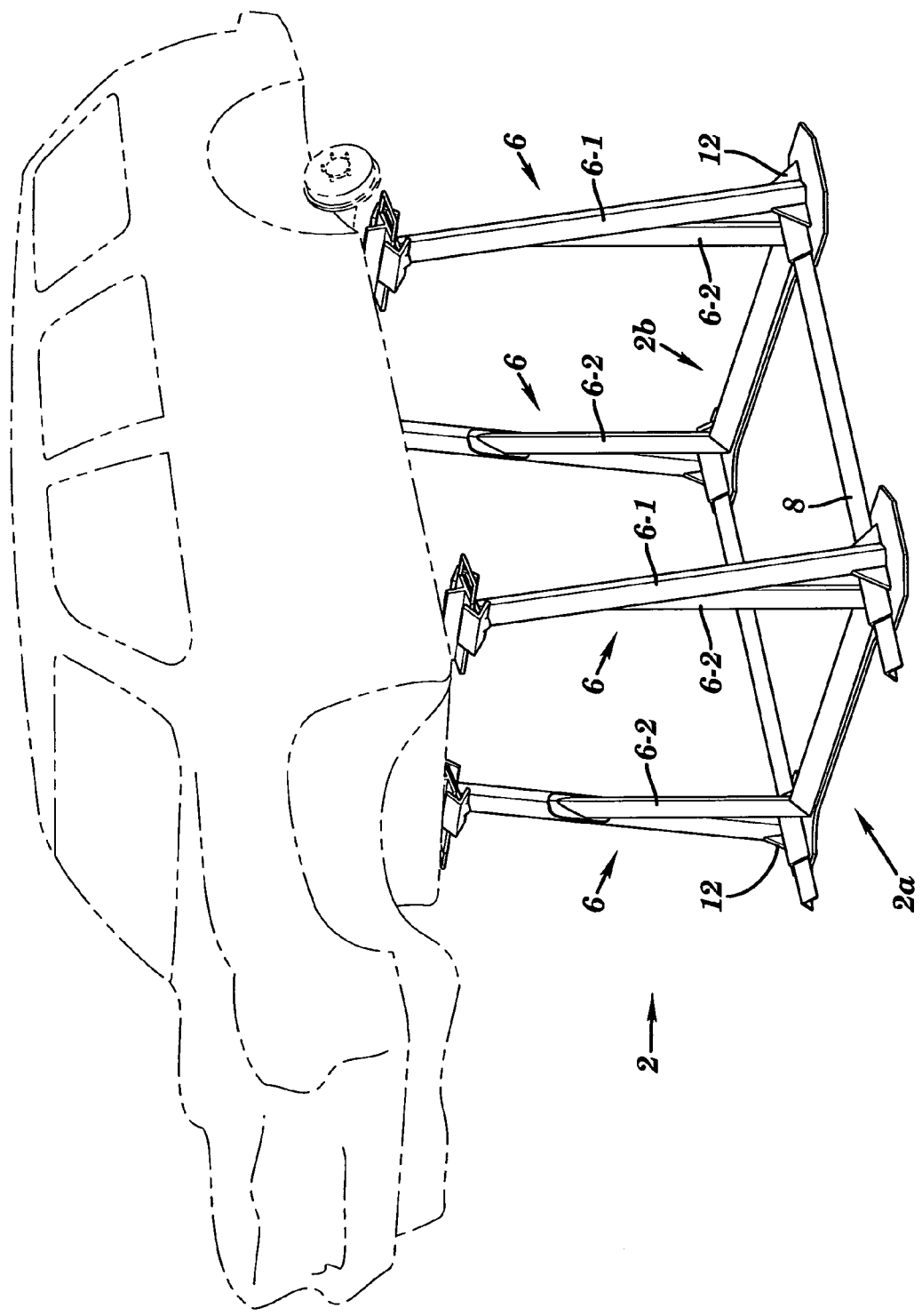
FIG. 7 shows a salvage vehicle mounted on a four-columned stand according to FIG. 5.

As indicated above, four-columned stands of the invention can be made adjustable in length by making the connections between female base links (7-3) and links (8) adjustable on one or both base plates (7-1). FIG. 5 shows a most preferred aspect of the invention, in which four-columned stand (2) is adjustable in only one direction. In this FIG. 5 the stand is adjustable from front to back. In order to most appropriately support the type and condition of the vehicle shown in FIG. 7, the front two-columned stand end (2a) as in FIG. 5 can be pushed back toward the back two columned stand end (2b) by sliding the stand end (2a) through female base links (7-3) along the links (8) using heaving equipment. More specifically, when moving a front or back end of a four-columned stand, using links (8), T-beams (3) are retracted fully inward toward the center of the stand and picked up by equipment having a long fork. The stand end that is to be moved is then pushed forward or pulled backward along the links to vary the distance between the front and back stand ends. In FIG. 5, links (8) are slid through each of the two female base links (7-3) on the front two-columned stand end (2a) for securing the stand in position. The connections between the female base links and their corresponding links on the back two-columned stand end (2b) are secured by welding and, in this embodiment, the rear stand end (2b) can not be moved inwardly toward stand end (2a). In another preferred embodiment links (8) are not welded to female base links (7-3), so that the stand is adjustable in length at both ends of the four-columned stand.

TABLE 1

| Components and Preferred Dimensions | Dimension Modifications |
|---|---|
| A. Horizontal Sliding T-Beam ½ of I-Beam split lengthwise @ Web | A. |
| Web Thickness 0.250 inch | 0.3125, 0.375, 0.50, 0.625 0.075 inch |
| Flange Thickness 0.50 inch | 0.625, 0.75, 0.875, 1.00 inch |
| Flange Width 5.25 inch | 5.375 to 12.00 inches |
| Length 15 inches | 14 to 21 inches |
| Height 2.50 inches | 2 to 6 inches |
| B. T-Beam Retainer Angle Iron | B. |
| Flange Thickness 0.375 inch | 0.50, 0.625, 0.75, 0.875, 1.00 inch |
| Flange Width 2.50 inches | 2.75 to 5.0 inches |
| Length 5.25 inches | 5.5 to 12 inches |
| C. Main Diagonal Column Structural Square Tubing | C. |
| Wall Width 4 inches | 4.5 to 10 inches |
| Wall Thickness 0.3125 inch | 0.375, 0.50, 0.625, 0.75, 1.00 inch |
| Length 68 inches | 66 to 72 inches |
| Angle cut on both ends 79 Degrees in parallel | 78 to 86 Degrees |
| D. Vertical Support Leg Angle Iron | D. |
| Flange Thickness 0.375 inch | 0.50, 0.625, 0.75, 0.875, 1.00 inch |
| Flange Width 4 inches | 4.5 to 10 inches |
| Length 44.25 inches | 42 to 48 inches |
| E. Base Plate | E. |

TABLE 1-continued

| Components and Preferred Dimensions | Dimension Modifications |
|---|---|
| Flat Steel Plate | |
| Thickness 0.50 inch | 0.625, 0.75, 0.875, 1.00 inch |
| Width 30 inches | 36 to 48 inches |
| Length 96 inches | 102 to 126 inches |
| F. Female Base Link | F. |
| Angle Iron | |
| Wall Thickness 0.3125 inch | 0.375, 0.50, 0.75 inch |
| Flange Width 4 inches | 5 to 6 inches |
| Length 15 inches | 15 to 24 inches |
| G. Link | G. |
| Angle Iron | |
| Wall Thickness 0.375 inch | 0.50, 0.625, 0.75, inch |
| Flange Width 3 inch | 4 to 5 inches |
| Length 113 inches | 108 to 144 inches |

A-Frame Style Stands Including a Height Adjustment Assembly

Figure 9:
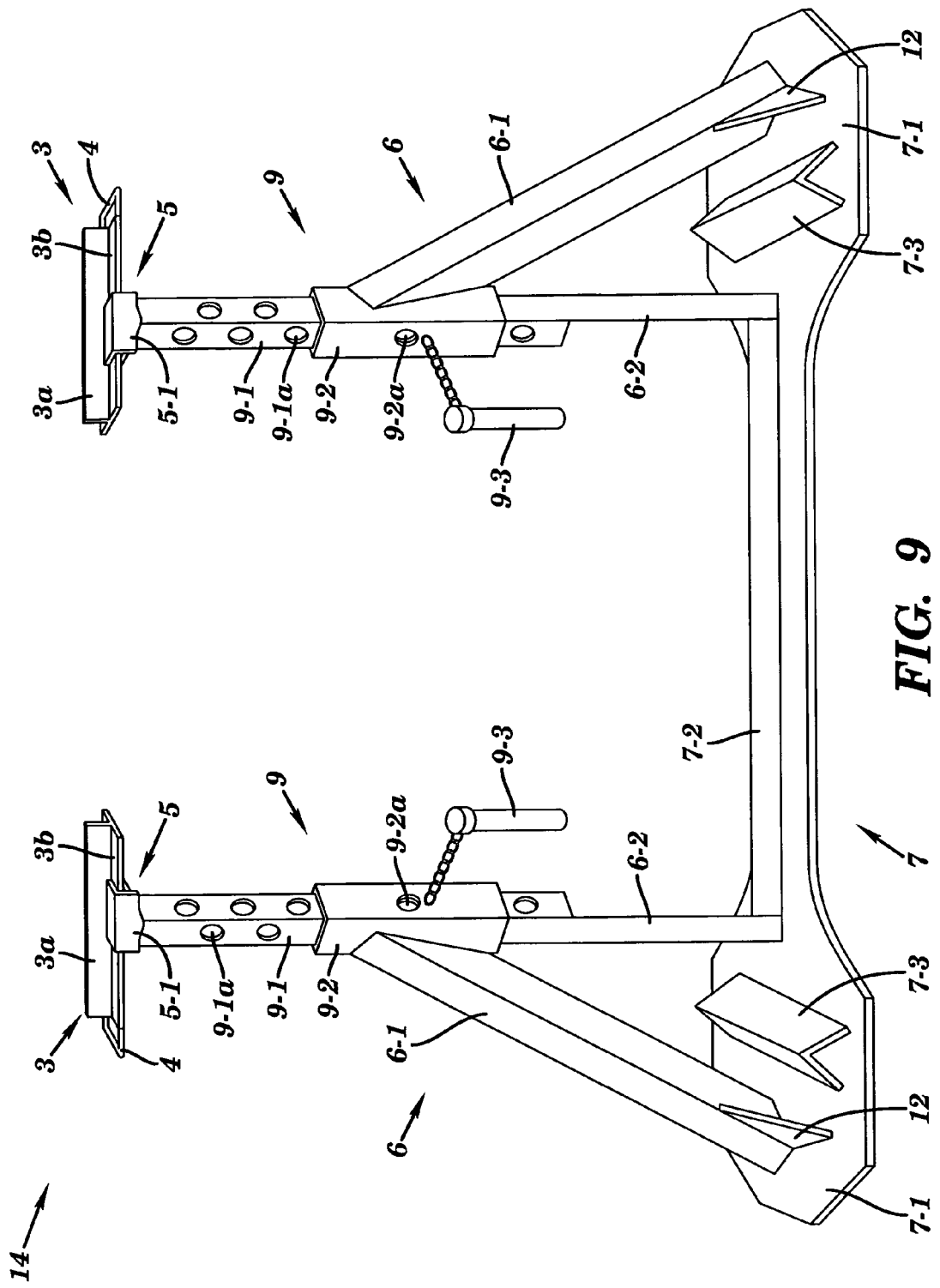
FIG. 9 is a perspective view of a two-columned stand of the invention, which is made to be adjustable in height by adding a height adjustment assembly into a diagonal column assembly.
Figure 10:
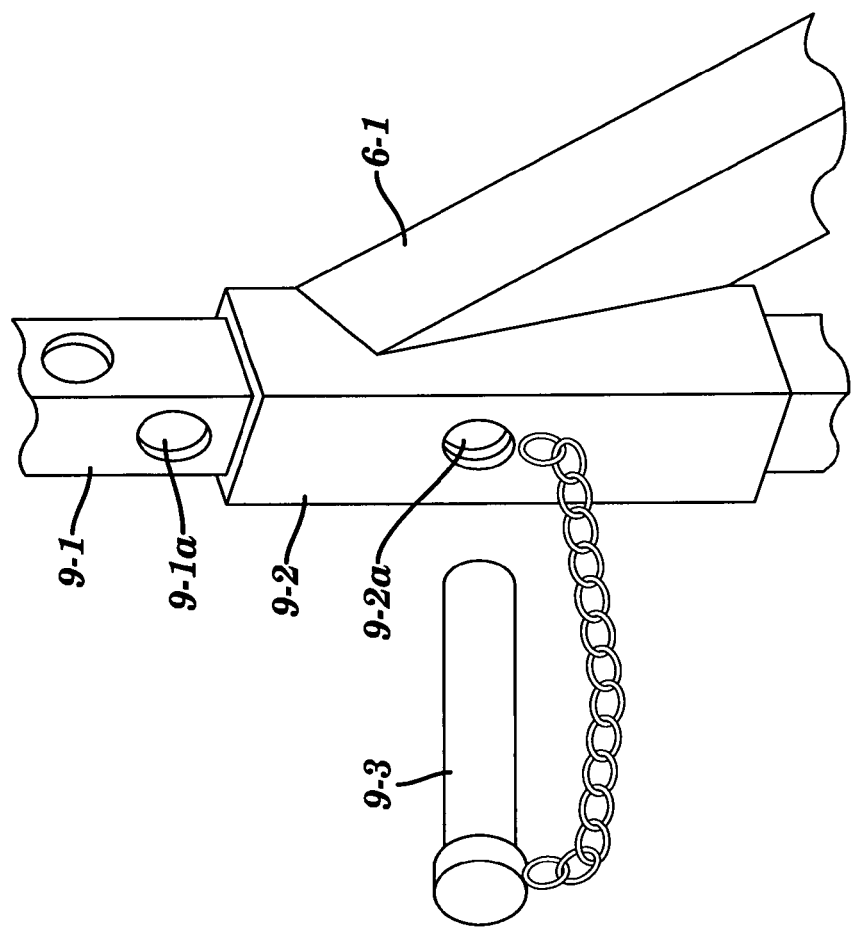
FIG. 10 is a detailed view of an adjustable portion of the height adjustment assembly according to FIG. 9.

FIG. 9 shows another preferred embodiment of a two-columned A-frame style stand, which is connectable, either adjustably or in fixed relation, to a second stand of the invention to form a complete four-columned A-frame style automobile dismantler's stand for removing parts from a virtually any motor vehicle.

Two-columned A frame style stand (14) is based upon similar structural considerations as two-columned stand (1) according to FIG. 1. However, some of the dimensions of the stand's components are different due to the incorporation of a height adjustment assembly (9) into the main diagonal column assembly. (6). Preferably, two-columned stand (14) is connected to a second two columned A frame style stand having essentially the same structure, using two horizontal ground level links (8), to form a four-columned, height adjustable stand, which can be used to dismantle motor vehicles similar in width, length and weight as a two-columned stand according to FIG. 1.

Height adjustment assembly (9) permits the height of the structure of two-columned stand (14) to be varied. Each height adjustment assembly of two-columned stand (14), or each height adjustment assembly of a four-columned stand made there from, may be adjusted to the same height or to different heights, depending upon the needs of the dismantler. A four-columned stand comprising a pair of two-columned stands having the components illustrated in FIG. 9 is also adjustable to accommodate vehicles ranging in width from about 5 to about 7.5 feet. The stand holds vehicles varying in length from about 12 to about 25 feet.

In this embodiment, the length of main diagonal columns (6-1) is 36 inches, the length of vertical support legs (6-2) is 27 inches and the length of base plate (7-1) that forms the width of the stand is 108 inches. Structural square tubing is cut on different angles on the top and bottom to form main diagonal columns (6-1). In FIG. 9. the angle on the top end of main diagonal column (6-1) is cut at 149 degrees and the angle on the bottom end of main diagonal column (6-1) is cut at 59 degrees. Because of its stability and strength, stand (14) may be used alone in automobile dismantling, preferably using two ground-level horizontal links according to the teachings of the invention. See Table 2 for preferred dimensions for a two-columned stand (14), whose elements are shown in FIG. 9, and for possible dimension modifications.

Each height adjustment assembly (9) includes vertical adjustment tube (9-2), vertical extendable column (9-1) and adjustment pin (9-3). Vertical adjustment tubes (9-2) and vertical extendable columns (9-1) are made of structural square tubing having the dimensions listed in Table 2. Other materials, such as other forms of structural tubing, aluminum or composites may also be used. Due to heavy load directed at its pinned location, adjustment pin (9-3) should be made from round stock steel, preferably hardened.

T-beam retainers (5-1) are firmly secured to the tops of vertical extendable columns (9-1); vertical extendable columns (9-1) form a component of height adjustment assembly (9) and also support vertical load. Vertical extendable column (9-1) defines a plurality of holes (9-1a) spaced vertically on at least one surface of the extendable column, which holes (9-1a) extend through to the opposite surface of the column. More specifically, holes (9-1a) are drilled straight through one wide flat surface of the structural square tubing to the opposing wide flat surface. In a most preferred embodiment, which provides maximum flexibility in height adjustment, a plurality of holes (9-1a) is also drilled straight through the other two opposing wide surfaces of the structural square tubing that forms the column. Holes are drilled in 6 inch increments on their respective surfaces but are staggered, so that height can be adjusted in 3 inch increments by lifting the vertical extendable column (9-1) out of the vertical adjustment tube (9-2), turning it ¼ turn and returning the extendable column back into the tube. See FIG. 9.

Each vertical support leg (6-2), formed of a piece of angle iron, is mounted on base plate (7-1) 180 degrees from the position that vertical support leg (6-2) is mounted on in FIG. 1. See FIGS. 1 and 9. This is so vertical support legs (6-2) can be mounted to the bottom of vertical adjustment tubes (9-2) in a way that allows that the flanges on the bottom of vertical adjustment tube (9-2) and the top of vertical support leg (6-2) to be firmly attached to one another. When so attached, vertical support leg (6-2) forms a guide for vertical extendable column (9-1) to follow when vertical extendable column (9-1) is being fully retracted, i.e., moved down to the ground. Vertical support leg (6-2) also keeps the stand from racking or leaning inward under heavy load.

Height adjustment is achieved by removing height adjustment pin (9-3) from the aligned holes in the vertical adjustment tube (9-2) and vertical extendable column (9-1) into which it is inserted and raising or lowering vertical extendable column (9-1) within vertical adjustment tube (9-2) to the height of a hole on the column that is lower or higher, respectively, than the one from which adjustment pin (9-3) was removed. Vertical extendable column (9-1) is raised or lowed by grabbing the top platform, in this preferred embodiment by T-beams (3), either by hand or using chains and fork from a front end loader or forklift.

TABLE 2

| Components and Preferred Dimensions | Dimension Modifications |
|---|---|
| A. Horizontal Sliding T-Beam ½ of I-Beam split lengthwise @ Web | A. |
| Web Thickness 0.375 inch | 0.50, 0.625, 0.75, 0.875, 1.00 inch |
| Flange Thickness 0.625 inch | 0.75, 0.875, 1.00, 1.50, 2.00 inches |

TABLE 2-continued

| Components and Preferred Dimensions | Dimension Modifications |
|---|---|
| Flange Width 5.25 | 5.375 to 10.50 inches |
| Length 16 inches | 15 to 32 inches |
| Height 4 inches | 4.00 to 10.00 inches |
| B. T-Beam Retainer Angle Iron | B. |
| Flange Thickness 0.375 inch | 0.50, 0.625, 0.75, 0.875, 1.00 inch |
| Flange Width 2.50 inches | 2.625 to 5.50 inches |
| Length 5.25 inches | 5.375 to 10.50 inches |
| C. Vertical Extendable Column Structural Square Tubing | C. |
| Wall Width 4 inches | 4 to 8 inches |
| Wall Thickness 0.375 inch | 0.50, 0.625, 0.75, 0.875, 1.00 inch |
| Length 45 inches | 30 to 48 inches |
| D. Vertical Adjustment Tube Structural Square Tubing | D. |
| Wall Width 5 inches | 5.00 to 10.00 inches |
| Wall Thickness 0.50 inches | 0625, 0.75, 0.875, 1.00 inch |
| Length 14 inches | |
| E. Adjustment Pin Hardened Round Stock | E. |
| Thickness 1.250 inches | 1.3125 to 2.00 inches |
| Length 7.250 inches | 7.3125 to 13.00 inches |
| F. Main Diagonal Column Structural Square Tubing | F. |
| Wall Width 4 inches | 4.0625 to 8.00 inches |
| Wall Thickness 0.50 inch | 0.625, 0.75, 0.875, 1.00 inch |
| Length 36 | 34 to 48 inches |
| Angle cut on top end 149 Degrees | 110 to 168 Degrees |
| Angle of cut on bottom end 59 Degrees | 22 to 80 Degrees |
| G. Vertical Support Leg Angle Iron | G. |
| Flange Thickness 0.375 inch | 0.50, 0.625, 0.75, 0.875, 1.00 inch |
| Flange Width 4 inches | 4.0625 to 8.00 inches |
| Length 27 inches | 26 to 36 inches |
| H. Base Plate Flat Steel Plate | H. |
| Thickness 0.625 inch | 0.75, 0.875, 1.00, 1.25, 1.5, 1.75, 2.00 inches |
| Width 36 inches | 30 to 48 inches |
| Length 108 inches | 96 to 144 inches |
| I. Female Base Link Angle Iron | I. |
| Wall Thickness 0.375 inch | 0.50, 0.625, 0.75 inch |
| Flange Width 5 inches | 5.5 to 8.00 inches |
| Length 18 inches | 15 to 24 inches |
| J. Link Angle Iron | J. |
| Wall Thickness 0.50 inch | 0.375, 0.625, 0.75 inch |
| Flange Width 4 inch | 4.0625 to 6.250 inches |
| Length 144 inches | 96 to 168 inches |

A-Frame Style Stands Having Fixed Dimensions

For salvage yards that do not require a high degree of flexibility in terms of the size of vehicles to be dismantled, but desire the unobstructed access provided by the A-frame style structure of the invention, two-columned and four-columned stands can be permanently fixed in all dimensions. For example, in this embodiment, two horizontal beams—one for each two-columned stand end—have the same lengths and are permanently attached to the tops the main diagonal columns to form a platform that fixes the width between top portions of the stand. Preferably, the horizontal beam is an I-beam, which can be fitted directly into horizontal T-beam assemblies (5). To permanently fix the distance between stand ends, and thereby fix the length of the vehicles that can be mounted thereon, a pair of two-columned stands may be connected using two horizontal, ground level links, each having the same length, which are firmly and directly attached to opposing end portions of the base plates. For example, links (8) may be welded or otherwise firmly secured in female base links (7-3) at any distance along a link or welded or otherwise firmly secured directly to the base plate ends.

Tool Options

FIG. 11 shows two different tools that optionally may be added to A-frame style stands of the invention.

FIG. 11A shows a D-ring assembly (10) including D-ring (10-1) and D-ring retainer (10-2). D-rings (10-1) such as the one shown are readily available in many sizes. b-rings for use in connection with the present invention are preferably made from hardened cast steel. The D-ring retainer is made out of regular steel.

D-ring assembly (10) can be mounted on main diagonal columns (6-1) at any height below T-beams (3) and above vertical support legs (6-2). It also can be mounted on any position of the circumference around main diagonal column (6-1), provided that it is not on the right angle corner of square or rectangle tubing. It can be also fitted to the flange or web of an I-Beam or H-Beam if this is the type of structural steel used to make the main diagonal column. D-ring retainer (10-2) must be modified for use on round tubing if it is to be mounted in a horizontal position, however it can also be mounted vertically or horizontally on any of the five types of structural tubing that can be used to make the main diagonal columns.

Although a vehicle can be placed on stands of the invention without restraints, having a D-ring assembly (10) attached to main diagonal columns on the stands does offer added safety benefits. For example, even though the stands of the inventions themselves are extremely stable, the weight distribution of a vehicle on the stand can change dramatically after large components have been removed. The purpose of D-ring (10-1) is to be able to tie the vehicle down on all four main diagonal columns, or on which ever column is needed to secure the vehicle to the a stand of the invention, in anticipation of how the vehicle will react after the component is removed. By tying the vehicle to a stand assembly in order to offset the change in weight distribution, the reaction is controlled.

When it comes time to remove the vehicle from the stand, as long as the forks of the equipment removing the vehicle are under the vehicle, the tie downs can be removed safely.

The reason to use D-ring (10-1) as opposed to other tie down devices is that it is almost impossible to weld a hook in a direction on the main diagonal column that is capable of retaining a chain or cable from column to vehicle if the vehicle has shifted in a direction that can loosen the tension on the tie down device. A fabric tie down device, such as a strap with a ratchet tightening mechanism, is not preferred, because the fabric is vulnerable to tearing or melting when metal cutting devises are being used. The D-ring (10-1) eliminates these potential problems. By running a chain, which is highly recommended, or cable, through the D-ring and finding a place on the vehicle to also run the chain or cable through, or with a hook on each end, fit one of the hook end to the vehicle, the chain can be adjusted to any desired length, and the chain hooked back to itself. When the hooks are properly placed through the D-ring and attached properly to the vehicle, it is highly unlikely the chain assembly will come apart.

D-rings are generally used for retaining heavy equipment on trailers or other hauling equipment and are very strong in yielding strength. This means that the size of the D-ring doesn't have to be large and bulky and become an obstruction to deal with.

FIG. 11B shows a dismantler's tool and hardware tray assembly (11), including tray (11-1) and mounting rod (11-2) and bushing tube (11-3), which optionally are included with stands of the invention Tool and hardware tray (11-1) is attached to vertical support legs (6-2) using a of a length of rod, called mounting rod (11-2), which is attached to the underneath of tray (11-1). Mounting rod (11-2) extends from under tray (11-1) and bends 90 degrees at a pre-selected point. To attach tray (11-1) to vertical support leg (6-2), mounting rod (11-2) is inserted into bushing tube (11-3). This configuration allows tray (11-1) to swivel. Tray (11-1) can be swung to be used in various directions, providing yet more flexibility for the dismantler. Bushing tubes may be mounted to each vertical support leg (6-2) so that the tray assembly (11) can be moved to various locations under and around the stand. Tray (11-1) is magnetic or non magnetic, and mounting rod (11-2) holding tray is preferably made to extend or retract to give it more or less length for reach to tray (11-1) for the dismantler.

While the invention has been described in detail with respect to several A-frame style stand structures, persons skilled in the art will appreciate the invention is not limited thereto and that A-frame style stands having all horizontal cross members located substantially at ground level can readily be designed and made using the teachings herein contained.

I claim:

1. An A-frame-style automotive dismantler's stand, comprising:
    a top platform, at least portions of which (1) contact components under or around a vehicle when the stand is in use and, (2) define the width of the stand at the top;
    a horizontal base, having first and second ends, which extends perpendicularly to the length of a vehicle when the stand is in use;
    a first free-standing diagonal column assembly, including:
        a first main diagonal column, which is angled inwardly and upwardly toward the center of the stand; and
        a first vertical load support, which is affixed to the first main diagonal column; and
    a second free-standing diagonal column assembly, including:
        a second main diagonal column, which is angled inwardly and upwardly toward the center of the stand; and
        a second vertical load support, which is affixed to the main diagonal column;
    bottom portions of the first diagonal column assembly are firmly attached to the first end of the horizontal base and bottom portions of the second diagonal column assembly are firmly attached to the second, opposite end of the horizontal base and
    the top platform is secured to top portions of the first and second diagonal column assemblies to support the top platform horizontally and in parallel relation to the length of the horizontal base.

2. A stand according to claim 1, wherein
    the first and second vertical load supports comprise vertical support legs, the vertical support legs extend perpendicularly from opposing ends of the horizontal base and top portions of the vertical support legs are affixed to corresponding first and second main diagonal columns.

3. A stand according to claim 2, wherein the top platform comprises a single unit and the width of the stand is not adjustable.

4. A stand according to claim 1, wherein the top platform comprises a pair of independent horizontal T-beams, one of which is mounted on top of the first diagonal column assembly and the other is mounted on top of the second diagonal column assembly, and
    the horizontal T-beams are mounted for sliding movement toward one-another and toward the center of the stand and away from one another toward the outer perimeter of the horizontal base of the horizontal base and the width of the stand at the top is adjustable.

5. A stand according to claim 4, wherein,
    when the horizontal T-beams are fully retracted toward the center-of the stand, the distance between the inner ends of the horizontal T-beams is about thirty inches and when the horizontal T-means are fully extended outwardly toward the perimeter of opposing ends of the horizontal base, the distance between the inner ends of the horizontal T-beams is about fifty inches.

6. A stand according to claim 4, wherein the height of the A-frame stand is adjustable.

7. A stand according to claim 6, wherein height adjustment assemblies are incorporated into the vertical load supports and each height adjustment assembly comprises:
    a vertical support leg having an upper end that defines a shape and a bottom end firmly attached to an end of the horizontal base;
    a vertical extendable column defining a plurality of holes, the holes are spaced vertically and extend through opposing wide surfaces of the column;
    a vertical adjustment tube that defines a hole that extends completely through opposing wide surfaces of the tube;
    an adjustment pin that can be inserted through any hole on the vertical extendable column and the hole on the vertical adjustment tube; and
    the vertical extendable column is mounted within the vertical adjustment tube in a manner that permits the holes defined in the respective height assembly components to be aligned in horizontal relationship; the vertical adjustment tube is firmly attached to an upper end of the main diagonal column, upper and lower ends of the main diagonal column are angled to support the vertical adjustment tube vertically and in perpendicular relation to the length of the horizontal base to permit the column to be raised and lowered within tube, and;
    the upper end of the vertical support leg is (1) securely affixed to the bottom of the vertical adjustment tube and (2) serves as a guide for the vertical extendable column when it is being lowered to the ground.

8. A stand according to claim 1, wherein the top platform comprises:

a pair of horizontal sliding T-beams;
a pair of T-beam retainer assemblies, each of which includes;
  a plate, on which a portion of the T-beam rests and slides;
  a T-beam retainer, contoured to hold a portion of the T-beam and a plate therein;
  wherein each T-beam of the pair is mounted in a T-beam retainer, a portion of the bottom of the T-beam is in contact with an upper surface of the plate; and the T-beam retainer is firmly attached to the plate, and
wherein, the T-beam retainer assemblies are secured to the diagonal column elements of the main diagonal column assemblies.

9. A stand according to claim 8, further comprising two female base links, each female base link is firmly attached to an opposing end of the horizontal base.

10. A stand according to claim 9, which is a two-columned stand having two diagonal column assemblies.

11. A stand according to claim 10, wherein the female base links are attached to the horizontal base between the main diagonal columns and the vertical support legs.

12. A four-columned, A-frame style automotive dismantler's stand, comprising:
  a pair of two-columned stands according to claim 10;
    the two, two-columned stands are located in parallel relation to one another, one of the two-columned stands forms a front end of the four-columned stand and the other forms the back end of the four-columned stand,
  two horizontal, ground level links, the links are parallel to each other and perpendicular to the horizontal bases of the front and back two-columned stands, wherein,
  one of the links connects the front and back two-columned stands at left ends of their horizontal bases and the other link connects the front and back two-columned stands at right ends of their horizontal bases.

13. A four-columned, A-frame style stand according to claim 12, wherein the connections between the front two-columned stand and the back two-columned stand are fixed and the four-columned stand is fixed in its length.

14. A four-columned, A-frame style stand according to claim 12, wherein the connections on at least one end of the four-columned stand are adjustable and the distance between the front and back ends of the four-columned stand can be varied to accommodate vehicles of different lengths.

15. A stand according to claim 1 wherein the height of the A-frame style stand is adjustable.

16. An A-frame style automotive dismantler's that is adjustable in its width at a top of stand, comprising:
  a pair of horizontal sliding T-beams;
  a pair of T-beam retainer assemblies, each including;
    a plate, on which a portion of the T-beam rests and slides;
    a T-beam retainer, contoured to hold a portion of the T-beam and the plate therein; wherein
  each sliding T-beam of the pair is mounted in a T-beam retainer, a portion of the bottom of the T-beam is in contact with an upper surface of the plate; and the T-beam retainer is firmly attached to the plate; and further comprises
  a pair of diagonal column assemblies, each including:
  a main diagonal column having fixed length, which ranges from about 66 to 72 inches, the main diagonal column is angled on both ends, wherein the angles provide a stand that is narrower at the top than at the base when the main diagonal column is mounted on the stand and, the top of the main diagonal column is firmly attached to a bottom of the T-beam retainer and holds the T-beam retainer horizontally and parallel to the ground so that the T-beam can slide on the plate within the T-beam retainer, inward toward the center of the top of the stand and outward toward the outside of the stand, and the inside width of the stand between the tops of the main diagonal columns ranges from 50 to 51 inches;
  a vertical support leg firmly attached to an inner surface of the main diagonal column, at a position that is about two thirds of the way up the total height of the main diagonal column, and
  a base plate that extends horizontally at ground level, having a length ranging from about 96 inches to about 126 inches, the base plate securely holds the main diagonal column assemblies in position so that the bottom of one main diagonal column is firmly attached to the left end of the base plate and the bottom of the other main diagonal column is firmly attached to the right end of the base plate, each diagonal column having the same length as the other, and
  the bottom of one vertical support leg is firmly attached to the left end of the base plate and the bottom of the other vertical support leg is firmly attached to the right end of the base plate,
  the points of attachment for the vertical support legs to the base plate ends are located closer to the center of the of the base plate than the points of attachment for the main diagonal columns.

17. An A-frame style stand according to claim 16, further comprising:
  a female base link that defines a channel that extending the length of the female base link
    the female base link is (1) firmly attached to one of the two ends of the base plate, (2) extends parallel with the length of a vehicle when the stand is in use and (3) is attached at a position located toward the outside of the end of the base plate relative to the point of attachment of the vertical load support to the same base plate end and
  a link having a structure capable of being received lengthwise within the channel of the female base link to form a connection,
    the link (1) is positioned horizontally at ground level, (2) extends lengthwise at a 90 degree angle relative to the length of the base plate and (3) is connected to the base via the female base link.

18. A combination of components for assembling an A-frame-style stand, comprising at least one two-columned stand according to claim 16 and at least one link.

19. A four-columned, A-frame style stand, comprising:
  a pair of two-columned stands;
    each two-columned stand (1) has a structure according claims 16 and (2) is located in parallel relation to the other, wherein,
    one two-columned stand forms a front end, and the other two-columned stand forms a back end, of the four-columned stand,
  four female base links,
    each one of the links (1) defines a channel that extends the length of the female base link, (2) is firmly attached to a different one of the four base plate ends and (3) extends parallel with the length of the vehicle when the vehicle is mounted on the stand, and (4) is firmly attached at a position located toward the outside end of the base plate relative to the point of attachment of the vertical load support located on the same base plate end and;

two horizontal ground level links that are parallel to one another and join the two-columned stand ends lengthwise, wherein one of the links connects the two left stand base plate ends by their two respective female base links and the second link connects the two right stand base plate ends by their two respective female base links, and the connections are adjustable so that the distance between the front and back ends of the stand can be varied to accommodate vehicles of differing length.

20. An A-frame style automotive dismantler's stand, comprising:

a pair of T-beams, a pair of horizontal sliding T-beam retainer assemblies, each including:

a plate on which a portion of the T-beam rests and slides;

a T-beam retainer contoured to hold a portion of the T-beam and a plate therein;

each T-beam of the pair is mounted in a T-beam retainer, a portion of the bottom of the beam is in contact with an upper surface of the plate; the T-beam retainer is firmly attached to the plate; and a pair of diagonal column assemblies, each including:

a main diagonal column having fixed length, which can range from about 34 to 48 inches, the main diagonal column is angled at both ends;

a vertical load support, including a vertical support leg having an upper edge that defines a shape;

a vertical extendable column that includes a plurality of holes spaced vertically on the column, the holes are made in one wide surface of the extendable column and extend through the opposing wide surface;

a vertical adjustment tube that defines a hole made in one wide surface of the adjustment tube and extends through the opposing surface; and a pin that can be inserted horizontally into the holes in the vertical extendable column and in the vertical extendable tube;

the vertical extendable column is mounted within the vertical adjustment tube so that the holes in the vertical adjustment tube and the holes on the vertical extendable column can be aligned in horizontal relation an outer vertical surface of the vertical adjustment tube, which is at a 90 degree angle to the surface defining the hole, is firmly attached to the top of the diagonal column, on the larger of the two angles formed on the ends of the main diagonal columns, the angles are formed to support the vertical adjustment tube vertically and in perpendicular relation to the ground to permit the column to be raised and lowered within tube and maintain an A-frame structure to the stand, a lower horizontal end of the surface of the vertical extendable column that is attached to the main diagonal column (1) has a shape to complement the shape defined by the vertical support leg and (2) is firmly attached thereto;

the top of the vertical adjustment column is firmly attached to a bottom of the T-beam retainer and holds the T-beam retainer horizontally and parallel to the ground so that the T-beam can slide horizontally on the plate within the T-beam retainer, inward toward the center of the top of the stand and outward toward the outside of the stand, and a base plate that extends horizontally at ground level, the base plate has a length ranging from about 96 to about the bottom of one main diagonal column is firmly attached to the left end of the base plate and the bottom of the other main diagonal column is firmly attached to the right end of the base plate, each diagonal column having the same length as the other and the bottom of the left vertical support leg, which serves as a guide for the vertical extendable column when it is being lowered to the ground, is firmly attached to the left end of the base plate and the bottom of the other vertical support leg firmly attached to the right end of the base plate, wherein the points of attachment for the vertical support legs to the ends of the base plate are located closer to the center to the of the base plate than the points of attachment for the main diagonal columns to the ends of the base plate.

21. An A-frame style automotive dismantler's stand comprising:

a pair of two-columned stands;

each two-columned stand (1) has a structure according claims 20 and (2) is located in parallel relation to the other, wherein, one two-columned stand forms a front end, and the other two-columned stand forms a back end, of the four-columned stand, four female base links, each one of the links (1) defines a channel that extends the length of the female base link, (2) is firmly attached to a different one of the four base plate ends, (3) extends parallel with the length of a vehicle when the vehicle is mounted on the stand, and (4) is firmly attached at a position located toward the outside end of the base plate relative to the point of attachment of the vertical load support located on the same base plate end and;

two horizontal ground level links that are parallel to one another and join the two-columned stand ends lengthwise, wherein one of the links connects the two left stand base plate ends by their two respective female base links and the second link connects the two right stand base plate ends by their two respective female base links, and the connections are adjustable so that the distance between the front and back ends of the stand can be varied to accommodate vehicles of differing length.

22. An A-frame style stand according to claim 21, further comprising:

a female base link that defines a channel that extends the length of the female base link, the female base link is (1) firmly attached to one of the two ends of the base plate, (2) parallel with the length of the vehicle when the vehicle is mounted on the stand and (3) attached at a position located toward the outside of the end of the base plate relative to the point of attachment of the vertical load support to the same base plate end and at least one link having a structure that is capable of being received lengthwise within the channel of the female base link to form a connection, the link (1) is positioned horizontally at ground level, (2) extends lengthwise at a 90 degree angle relative to the length of the base plate and (3) is connected to the base plate via the female base link.

23. A combination of components for assembling an A-frame-style stand, comprising: at least one two-columned stand according to claim 20 and at least one link.

* * * * *